Patented Apr. 1, 1947

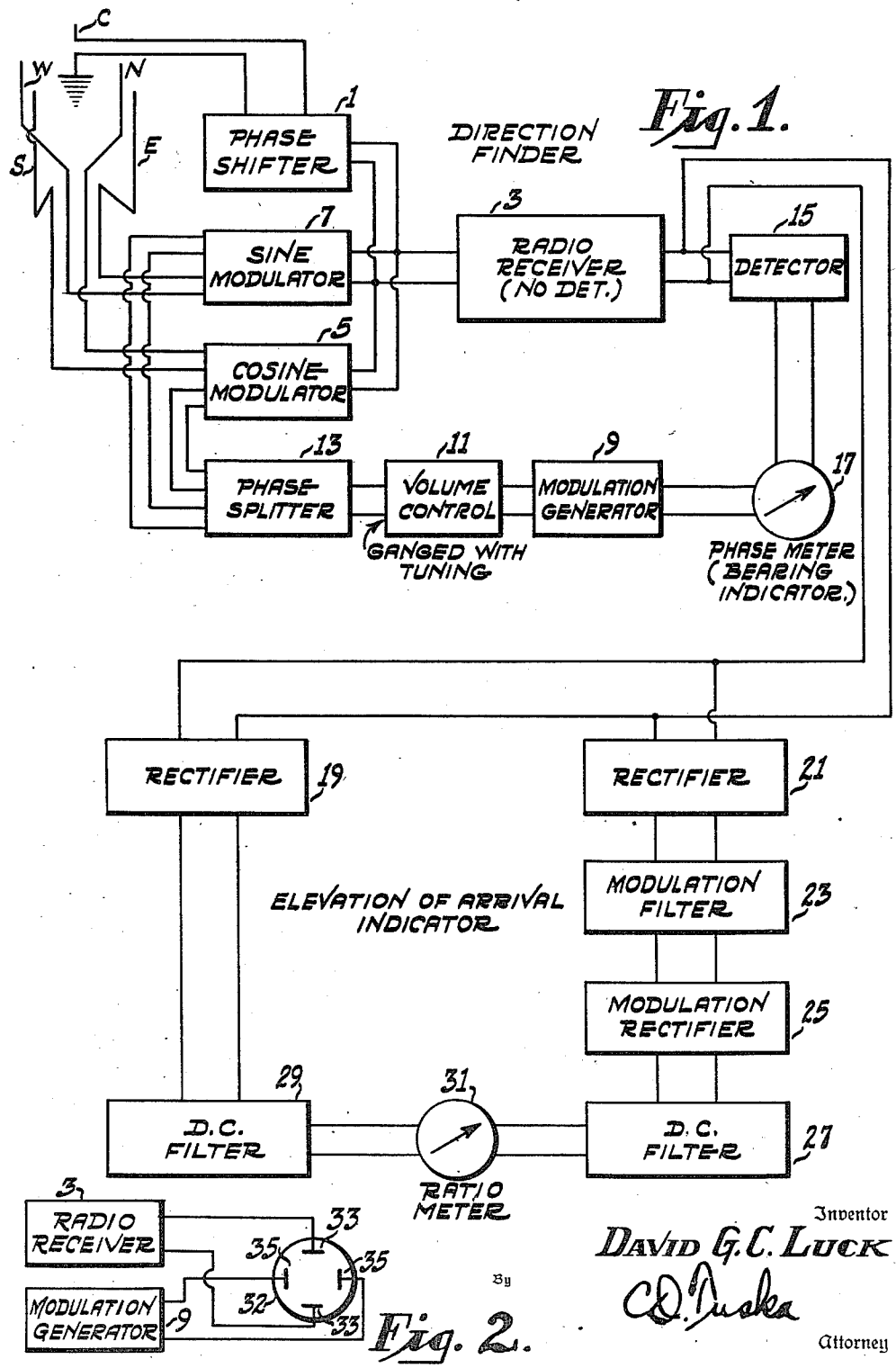

2,418,308

UNITED STATES PATENT OFFICE 2,418,308

RADIO DIRECTION FINDER

David G. C. Luck, Merchantville, N. J., assignor to Radio Corporation of America, a corporation of Delaware Application June 27, 1942, Serial No. 448,718

2 Claims. (Cl. 250—11)

This invention relates to direction finders, and more particularly to a method of and means for obtaining an indication of the suitability of a received signal for direction finding.

In U. S. application Serial No. 432,370, entitled Radio direction finding, filed February 26, 1942, by D. G. C. Luck, there is described a somewhat complex system for giving warning of the presence of wave types unfavorable for direction finding. That system is complete in itself and operates independently of any associated direction finder.

Consideration of the operation of certain types of direction finders has shown that the desired information may be made available by the addition of a few simple components to the equipment of the direction finder itself.

In a direction finder comprising a plurality of identical antennas spaced apart horizontally, the vertical directive pattern of the antenna array is different from that of a single component antenna because of the foreshortening of the spacing encountered by a downcoming wave. This pattern difference is utilized in the present invention to indicate elevation of wave arrival and so warn against taking bearings on steeply downcoming waves.

It is an object of this invention to provide an improved method of and means for indicating the suitability of a signal for direction finding.

Another object is to provide an improved method of and means for obtaining said indication from certain types of direction finders by the use of relatively simple auxiliary equipment.

These and other and incidental objects will become apparent to those skilled in the art upon consideration of the following description, with reference to the accompanying drawing, in which Fig. 1 is a schematic block diagram of a direction finder provided with an elevation of arrival indicator according to this invention, and Fig. 2 is a block diagram of a modified elevation of arrival indicator.

Referring to the drawing, the group of apparatus generally designated as "Direction finder" constitutes a direct indicating direction finder of the type described in U. S. Patent 2,208,378, filed on June 30, 1938, by D. G. C. Luck and entitled Continuously indicating radio compass. This type of direction finder lends itself particularly well to the application of the present invention which is embodied in the group of apparatus generally designated in the drawing as Elevation of arrival indicator.

The direction finder, which is fully described in said U. S. Patent No. 2,208.378, comprises antennas N, S, E, and W arranged at the corners of a square, as in the Adcock type direction finders, and a non-directive antenna C positioned at the center of the square. The antenna C is connected through a phase shifter 1 to the input of a radio receiver 3. The antennas N and S are connected in opposition to the input of a balanced modulator 5, and the antennas E and W are similarly connected to a balanced modulator 7.

An oscillator or modulation generator 9 is connected through a volume control 11 to a phase splitter 13, which derives from the oscillator output two voltages of equal amplitudes and in quadrature phase with respect to each other. The two outputs of the phase splitter 13 are connected to the modulation inputs of the balanced modulators 5 and 7, respectively.

In the present instance, the radio receiver 3 is shown separately from its detector 15, which is represented in the drawing by a separate block connected to the receiver. The output of the detector 15 is connected to a phase meter or other suitable bearing indicator 17, which is also connected to the modulation generator 9.

The elevation of arrival indicator is connected to the radio receiver 3 ahead of its detector 15, and includes two rectifiers 19 and 21. The output of the rectifier 19 is connected through a D. C. filter 29 to one input of a ratio meter 31. The output of the rectifier 21 is connected through a modulation filter 23 to a rectifier 25, which is in turn connected through a D. C. filter 27 to a second input circuit of the ratio meter 31.

In the operation of the direction finder, the outputs of the antenna pairs N—S and E—W are variably combined through the balanced modulators 5 and 7 with the output of the reference antenna C, to simulate the output of an antenna having a horizontal directive pattern in the form of a limacon; that is, a sinusoidal function of the azimuth, and rotating at the frequency of the modulation generator 9. The composite signal at the input of the radio receiver 3, when a wave reaches the antennas, is modulated at the frequency of the simulated directive pattern rotation, with a modulation phase dependent directly on the azimuth of arrival of the wave. This signal is amplified by the receiver 3 and the modulation is separated from the carrier by the detector 15. The modulation frequency output of the detector is compared in phase with the output of the modulation generator 9, by means of a phase meter 17, to give a direct bearing indication.

The carrier level of the modulated signal at the input of the radio receiver 3 is determined by the output of the single antenna C. The vertical directive pattern of the antenna C is some function F of the angle of elevation $\alpha$ of wave arrival. The side band level is determined by the output of a spaced pair of antennas, (each similar to C) with a vertical directive pattern $F(\alpha) \cos \alpha$. The depth of modulation of the signal at the receiver input is therefore proportional to the cosine of the angle of elevation $\alpha$. Any device which will indicate the depth to which the signal is modulated, at the frequency of the simulated antenna rotation, will show the wave arrival elevation.

The elevation of arrival indicator operates to perform this function as follows: The radio frequency or intermediate frequency output of the receiver 3 is rectified by the devices 19 and 21. The D. C. component of the output of the rectifier 19 is separated out by the filter 29 and fed to one of the coils of the ratio meter 31. The pattern rotation frequency modulation component in the output of the rectifier 21 is separated out by the filter 23, rectified by the device 25, and smoothed by the D. C. filter 27. The output of the filter 29 is proportional to the carrier amplitude and the output of the filter 27 is proportional to the modulation amplitude. The ratio meter 31 gives an indication of the modulation depth by comparing these D. C. voltages. The meter 31 may be calibrated directly in degrees of elevation angle of wave arrival.

This information, together with a knowledge of the accuracy of the direction finder on down-coming waves, will indicate whether or not the signal being received is capable of giving a useful bearing. For example, if a short wave Adcock system is adjusted to give 60 percent modulation of a signal arriving horizontally, then any signal showing less than 30 percent modulation is coming down from an elevation of over 60 degrees, and should not be used for taking a bearing. If the modulation depth exceeds 60 percent for any signal received by the same system, interference between rays travelling over separate paths must be the cause, and no bearing should be taken.

The relative strength of the signal picked up by a single antenna and that obtainable by combining the outputs of crossed spaced pairs of similar antennas depends not only upon the elevation of signal arrival but also upon the signal frequency. For operating convenience, all signals arriving from the same elevation should be modulated to the same depth, regardless of frequency. This may be accomplished by adjusting the relative gains in the reference antenna and the directive antenna channels before mixing, by a control ganged with the receiver tuning control. In the illustrated system, the amplitude of the modulation voltages is controlled by the volume control 11.

A crossed coil relay may be substituted for the meter 31 and arranged to operate a warning device whenever the depth of modulation lies outside a prescribed range.

An alternative procedure for selecting the desired modulation component for measurement is to employ a cathode ray oscillograph, 32 as shown in Fig. 2, with one pair of deflecting plates 33 energized by the radio frequency or intermediate frequency output of the receiver 3 and the other pair of plates 35 connected to the modulating oscillator 9. The resulting oscillograph pattern will be the well-known trapezoid pattern often used for modulation depth measurement. Modulation other than that produced by the local modulation generator 9 gives no stationary pattern and so does not interfere seriously with the indication.

Thus the invention has been described as a direction finder incorporating a system for indicating automatically the elevation of arrival of a received signal. This is accomplished by comparing the amplitudes of the outputs of two antenna systems having different vertical directive patterns. In certain types of direction finders, using spaced antenna arrays, it is convenient to use the same antennas and associated apparatus for obtaining the signals to be compared. The signal received by one antenna system may be passed through a balanced modulator controlled by a local oscillator and then combined with the signal from the other antenna; the composite signal is thus modulated at the local oscillator frequency to a depth depending on the relative amplitudes of the signals from the two antenna systems. Hence the modulation depth is an indication of the angle of elevation of arrival of the waves received at the antennas, and may be measured by any suitable means and interpreted in terms of said angle.

I claim as my invention:

1. The method of determining the elevation of arrival of electromagnetic waves at a point comprising the steps of deriving from said waves a first voltage having an amplitude which is a function of said elevation, deriving a second voltage which is a similar function of said elevation times the cosine of the angle of said elevation, and determining the ratio of said first voltage to said second voltage.

2. The method of determining the suitability for direction finding of radiation arriving at a point comprising the steps of deriving from said radiation a first voltage having an amplitude bearing a predetermined relation to said elevation, deriving from said radiation a second voltage having an amplitude bearing a different predetermined relation to said elevation, modulating said second voltage at a constant predetermined frequency, adding said first voltage to said modulated second voltage and determining the depth of modulation at said modulating frequency of the resultant voltage.

DAVID G. C. LUCK.

REFERENCES CITED

The following references are of record in the file of this patent:

UNITED STATES PATENTS

| Number | Name | Date |
| --- | --- | --- |
| 1,967,306 | Hallen | July 24, 1934 |
| 2,078,285 | Schrader | Apr. 27, 1937 |
| 2,082,492 | Grumel | June 1, 1937 |
| 2,208,378 | Luck | July 16, 1940 |

OTHER REFERENCES

Bell Telephone System, Monograph B-772, entitled "Determination of the Direction of Arrival of Short Radio Waves," by H. T. Friis et al., 1934, pp. 1 to 3.